United States Patent
Zhang et al.

(10) Patent No.: US 7,436,834 B1
(45) Date of Patent: Oct. 14, 2008

(54) EFFICIENT FRAME RETRANSMISSION IN A WIRELESS COMMUNICATION ENVIRONMENT

(76) Inventors: Hang Zhang, 24 Gardengate Way, Nepean (CA) K2G 5Z1; Bassam M. Hashem, 10-6 Deerfield Dr., Nepean (CA) K2G 3R6; Mark Earnshaw, 18A Woodfield Dr., Nepean (CA) K2G 3Y5; Eman A Fituri, 44 Greynam Ct., Nepean (CA) K2G 5S9

( * ) Notice: Subject to any disclaimer, the term of this patent is extended or adjusted under 35 U.S.C. 154(b) by 0 days.

(21) Appl. No.: 11/552,797

(22) Filed: Oct. 25, 2006

Related U.S. Application Data

(62) Division of application No. 10/108,577, filed on Mar. 28, 2002, now Pat. No. 7,145,889.

(51) Int. Cl.
H04L 12/26 (2006.01)

(52) U.S. Cl. ............ 370/389; 370/394; 370/469

(58) Field of Classification Search ........... 370/389, 370/394, 469
See application file for complete search history.

(56) References Cited

U.S. PATENT DOCUMENTS

| | | | |
|---|---|---|---|
| 5,555,266 A | | 9/1996 | Buchholz et al. |
| 6,718,500 B1 | * | 4/2004 | Lee et al. ............ 714/749 |
| 6,895,010 B1 | * | 5/2005 | Chang et al. ............ 370/394 |
| 6,944,802 B2 | * | 9/2005 | Park et al. ............ 714/701 |
| 7,388,852 B2 | * | 6/2008 | Zhang et al. ............ 370/335 |
| 2005/0030953 A1 | | 2/2005 | Vasudevan et al. |
| 2006/0176856 A1 | | 8/2006 | Yang et al. |
| 2006/0187955 A1 | * | 8/2006 | Rezaiifar et al. ............ 370/464 |
| 2006/0198341 A1 | * | 9/2006 | Singh et al. ............ 370/331 |

* cited by examiner

Primary Examiner—Melvin Marcelo
(74) Attorney, Agent, or Firm—Withrow & Terranova, PLLC

(57) ABSTRACT

A multiplexer function maintains a transmission table of all link control frames sent to a physical layer for transmission to a receiver. The transmission table includes a list of frames from various link control entities in the order in which they were multiplexed together to form a stream of frames. At the receiver, when a frame is detected that is in error, the physical layer sends an indication to its associated demultiplexer function, which sets a timer. When the timer expires, the demultiplexer function issues a message, such as a negative acknowledgement message, directly to the sender via the physical layer. The message includes information about the link control frames preceding and following the errant frame. The identified frames may be associated with different link control entities, and are preferably provided in the order in which they were received. The multiplexer function compares the identified frames in the message to the list of frames in the transmission table to identify the errant frame or frames and operates to effect retransmission of the errant frame.

16 Claims, 4 Drawing Sheets

EFFICIENT FRAME RETRANSMISSION IN A WIRELESS COMMUNICATION ENVIRONMENT

This application is a Divisional of U.S. patent application Ser. No. 10/108,577 filed Mar. 28, 2002, currently pending, the disclosure of which is incorporated herein by reference in its entirety.

FIELD OF THE INVENTION

The present invention relates to wireless communications, and in particular to facilitating faster and more efficient retransmission of lost or corrupt data.

BACKGROUND OF THE INVENTION

Many wireless communication systems assign transmission resources using one or more schedulers associated with a base station, which serves multiple mobile terminals. Typically, these resources have a time division multiple access (TDMA) component, wherein communications between the base station and a select mobile terminal are assigned to a given time slot. For downlink communications wherein the base station transmits data to the mobile terminal, the base station's downlink scheduler receives data for transmission to the mobile terminal, and allocates a certain time slot in which to transmit data to the mobile terminal. Notably, transmissions to different mobile terminals are assigned to different time slots to facilitate an ordered transmission of data amongst the mobile terminals. Similarly, in uplink communications wherein the mobile terminal transmits data to the base station for delivery across the network, the base station's uplink scheduler determines when the mobile terminal can transmit information to the base station, and via control signaling, instructs the mobile terminal of the time slots in which to transmit data to the base station.

Typically, packets of data are sequentially transmitted between the base station and the mobile terminal in the form of frames, which may be lost or corrupted due to channel conditions during transmission. The major objectives of layer 2 protocols in wireless access networks are to perform resource sharing among multiple services and multiple users and to provide improved radio link quality and reliability by implementing a retransmission mechanism for lost or corrupted frames associated with non-delay-sensitive services and applications. For CDMA standard, the radio link protocol (RLP) uses an automatic repeat request (ARQ) protocol to monitor incoming frames and request retransmission of lost or corrupted frames. An Internet Protocol (IP) based RLP design allows an RLP frame to encapsulate an IP packet or fragment of an IP packet. Each RLP frame header includes a sequence number to maintain the integrity of RLP frames flowing over the wireless link. In a negative acknowledgment (NAK) based RLP ARQ scheme, after identifying the loss of an RLP frame at the receiver RLP entity, a NAK is sent to the transmitter RLP entity. The NAK identifies the lost RLP frame and triggers retransmission of the lost RLP frame by the transmitter RLP entity. Lost RLP frames are determined by checking the sequence numbers of subsequently received RLP frames. Once an RLP frame is lost, a significant amount of time may pass before receiving a subsequent RLP frame, which is capable of providing information to determine that the previous RLP frame was lost.

For example, the reception of RLP frames N and N+2 in a row indicates that RLP frame N+1 was lost. After receiving RLP frame N+2, the receiver RLP entity sends a NAK request indicating a frame was lost. In a high-speed wireless Internet access system, arrival times for frames often vary greatly due to the high non-stream-like nature, or burstiness, of packet applications. If frame N+2 arrives at the receiver a relatively long time after RLP frame N, then the receiver RLP layer will take a longer period of time to identify the possible loss of RLP frame N+1. The result is a longer wireless link delay for RLP frame N+1.

In a traditional RLP scheme, retransmissions are under control of the transmission RLP entity. That is, the receiver RLP entity is only responsible for informing the transmission RLP entity that a given RLP frame was lost or received in error. The transmission RLP entity is responsible for determining when to retransmit that RLP frame and how many copies to include based on requisite retransmission parameters. The retransmission parameters are primarily a function of the QoS level associated with the data stream being considered. For example, the retransmission parameters may relate to acceptable error rates and transmission delays.

As noted above, the base station controls resources for uplink communications. If the mobile terminal does not have any extra transmission resources to use for retransmission purposes, then the mobile terminal's RLP entity would need to request additional transmission resources from the base station to perform any required retransmissions. When an RLP frame is lost, the base station's RLP entity sends a NAK to the mobile terminal's RLP entity. The mobile terminal has to determine what additional transmission resources are required for retransmission and then request those resources from the base station via a transmission request. Under control of the uplink scheduler, the base station must grant the additional resources for the mobile terminal, schedule transmission of the transmission grant, and transmit the transmission grant to the mobile terminal. Upon receipt of the transmission grant, the mobile terminal's RLP entity is then finally able to initiate retransmission of the frame and any copies thereof. The process involves an extra round of signaling between the mobile terminal and the base station, thereby increasing both the delay due to retransmission and the amount of signaling overhead carried on both uplink and downlink channels.

Accordingly, the traditional RLP schemes incur additional delays and signaling overhead due to the need for the mobile terminal's RLP entity to request additional transmission resources from the base station's uplink scheduler for each retransmission. The additional signaling delays reduce the QoS levels for uplink communications. Further, the extra signaling overhead will likely have a negative impact on total system capacity, since it will reduce the amount of user data that can be transmitted over both the uplink and downlink. As such, there is a need to minimize the time required to identify lost or corrupt RLP frames and to decrease the delay in retransmitting the lost or corrupt RLP frames without sacrificing reliability.

SUMMARY OF THE INVENTION

The present invention relates to a link control automatic repeat request (ARQ) operation in a wireless communication environment. When a terminal sends an original request for communication resources, the request includes not only payload size, but preferably quality of service parameters associated with the data to be transmitted. During uplink communications, the base station performs the link control based ARQ for lost or corrupt packets. When lost or corrupt packets are identified, a link control entity at the base station determines the appropriate retransmission parameters and contacts the uplink scheduler, if necessary, to obtain the corresponding communication resources for retransmission. The additional communication resources for retransmission are provided in a message, such as a negative acknowledgement message, which is sent to the mobile terminal to trigger retransmission of the lost or corrupted data.

The link control ARQ operation may switch between traditional ARQ operation wherein the mobile terminal controls retransmission, and that of the present invention wherein the base station controls retransmission, depending on whether sufficient communication resources have been previously allocated to the mobile terminal. Since the base station is aware of the quantity of communication resources that have already been granted to the mobile terminal, the base station can dynamically switch between the retransmission modes.

Accordingly, when retransmission is required, the base station checks with the uplink scheduler to determine the availability of the communication resources already assigned to the mobile terminal. If the previously assigned resources are sufficient for retransmission, the base station may issue a simple negative acknowledgement without the provisioning of additional communication resources for retransmission. Otherwise, the base station will request additional communication resources from the uplink scheduler and grant the additional communication resources via the negative acknowledgement message.

In another embodiment of the present invention, a multiplexer function of the sender maintains a transmission table of all link control frames sent to a physical layer for transmission to a receiver. The transmission table includes a list of frames from various link control entities in the order in which they were multiplexed together to form a stream of frames. At the receiver, when a link control frame is detected that is in error, the physical layer sends an indication to its associated demultiplexer function, which sets a timer. When the timer expires, the demultiplexer function issues a message, such as a negative acknowledgement message, directly to the sender via the physical layer. The message includes information about the link control frames preceding and following the errant frame. The identified frames may be associated with different link control entities, and are preferably provided in the order in which they were received.

The multiplexer function of the sender compares the identified frames in the message to the list of frames in the transmission table to identify the errant frame or frames. Once the errant frame is identified, the multiplexer function will operate to effect retransmission of the errant frame. The multiplexer function may directly send the frame, or may contact the associated RLP entity to trigger immediate retransmission.

If the errant frame is only partially corrupted, wherein the receiver can determine the identity of the frame but not its contents, the demultiplexer function may notify the corresponding link control entity to trigger a negative acknowledgement message or the like, specifically identifying the errant frame. This embodiment is applicable to uplink and downlink communications.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
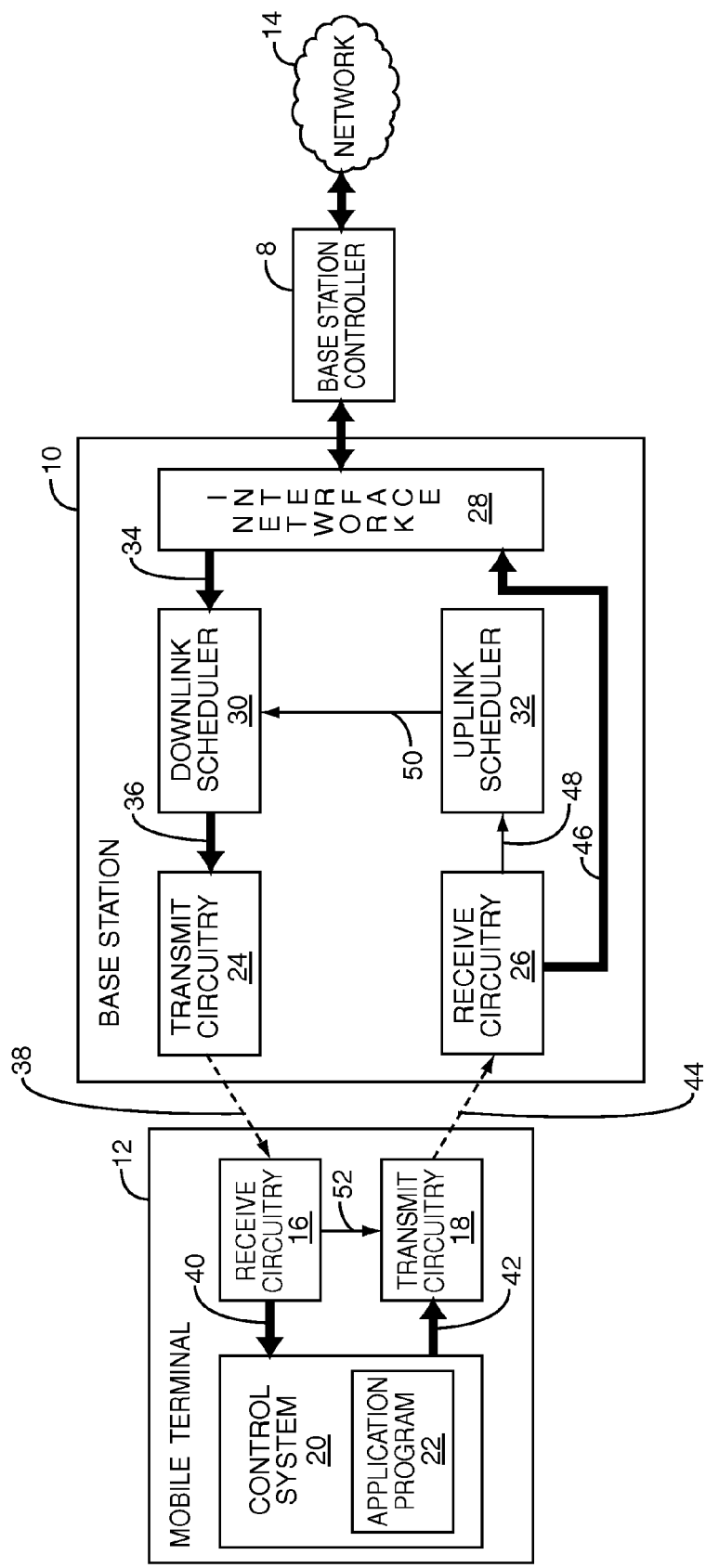
FIG. 1 is block representation of a communication environment including a base station, base station controller, and mobile terminal.

With reference to FIG. 1, an exemplary wireless communication environment is illustrated, wherein a base station controller 8 and a base station 10 cooperate to facilitate communications between a mobile terminal 12 and any number of devices on a network 14. In general, the mobile terminal 12 includes receive circuitry 16 and transmit circuitry 18 for facilitating downlink and uplink communications, respectively, with the base station 10. The mobile terminal 12 will also include a control system 20 having resident application programs 22, which are capable of processing incoming information and providing outgoing information for transmission to the base station 10 via the transmit circuitry 18.

In one embodiment, the base station controller 8 will control a number of associated base stations 10 and act as an interface to the network 14, which may be a packet network, such as the Internet. Although the described embodiments allocate significant functionality in the base station 10, much of the functionality can also be allocated to the base station controller 8 or shared between the base station 10 and the base station controller 8. The base station 10 may include transmit circuitry 24 and receive circuitry 26 configured to facilitate wireless communications with the mobile terminal 12. The transmit and receive circuitry 24, 26 cooperate with a network interface 28, a downlink scheduler 30, and an uplink scheduler 32 to schedule communications between the mobile terminal 12 and the network 14, via the base station controller 8. In general, the thick, solid lines indicate dataflow; the thin, solid lines indicate control and signaling information; and the dashed lines indicate wireless communications, which may include data control and signaling information.

For downlink communications, data received directly or indirectly from the network 14 at the network interface 28 is delivered to the downlink scheduler 30 (line 34) for scheduling. Notably, data is continuously received for a variety of mobile terminals 12 that are served by the base station 10, and the downlink scheduler 30 will schedule the data to be transmitted to the mobile terminal 12 during a given time slot within a scheduling period. Once scheduled, the data is systematically provided to the transmit circuitry 24 (line 36) for transmission to the various mobile terminals 12 during a time period corresponding to the assigned time slot (line 38).

As those skilled in the art will appreciate, the transmitted data is attached with a user identification or other equivalent method such that the mobile terminal 12 will only receive and recover information intended to be transmitted and ignore information intended for other mobile terminals 12. Accordingly, the receive circuitry 16 of the mobile terminal 12 will receive, downconvert, and demodulate the transmitted signals to uncover the transmitted data, which is then sent to the proper application program 22 of the control system 20 (line 40).

For uplink communications, the application program 22 will generate data for delivery over the packet network 14. The control system 20 will deliver the data to be transmitted to the mobile terminal's transmit circuitry 18 (line 42), which will modulate and transmit the data to the base station 10 (line 44). The receive circuitry 26 of the base station 10 will downconvert, demodulate, and recover the transmitted data, which will be delivered to the network interface 28 (line 46) for delivery to the packet network 14.

Notably, the uplink and downlink communications (lines 38 and 44) also include control signaling and other information to facilitate reliable communications between the mobile terminal 12 and the base station 10. A significant amount of control signaling between the mobile terminal 12 and the base station 10 relates to scheduling uplink transmissions from the mobile terminal 12 to the base station 10. For example, the mobile terminal 12 typically transmits only during certain time slots in an uplink scheduling period, wherein the base station 10, via downlink communications (line 38), tells the mobile terminal 12 which slots to use for uplink communications (line 44). Accordingly, the mobile terminal 12 will send transmission requests to the base station 10. The transmission requests are received and processed in the receive circuitry 26 and sent to the uplink scheduler 32 (line 48).

The uplink scheduler 32 will process the transmission requests from the mobile terminal 12 and provide transmission grants for the mobile terminal 12. The transmission grants authorize the mobile terminal 12 to transmit for uplink communications during defined time slots. The transmission grants must be sent to the mobile terminal 12 via downlink communications (line 38), and thus are sent to the downlink scheduler 30 (line 50), which will schedule delivery of the transmission requests along with the data being transmitted to the various mobile terminals 12 as described above. The mobile terminal 12 will receive the transmission grant and transmit the data subject to the transmission request during the time slot or slots authorized by the base station 10.

The base station 10 must provide transmission grants for both data being transmitted and data being retransmitted because the originally transmitted data was lost. Packets of data are sequentially transmitted between the base station 10 and the mobile terminal 12 in the form of frames, which may be lost or corrupted due to channel conditions during transmission. Accordingly, when the receive circuitry 16 of the mobile terminal detects that a frame has been lost or corrupted, the transmit circuitry 18 of the mobile terminal 12 is signaled of the loss (line 52) and operates to send information bearing on the lost or corrupted frame to the receive circuitry 26 of the base station 10 (line 44). As with original transmissions, retransmission may require an additional allocation of communication resources. Accordingly, the uplink scheduler 32 must schedule resources for retransmission and cooperate with the downlink scheduler 30 (line 50) to transmit a transmission grant to the mobile terminal 12.

Figure 2:
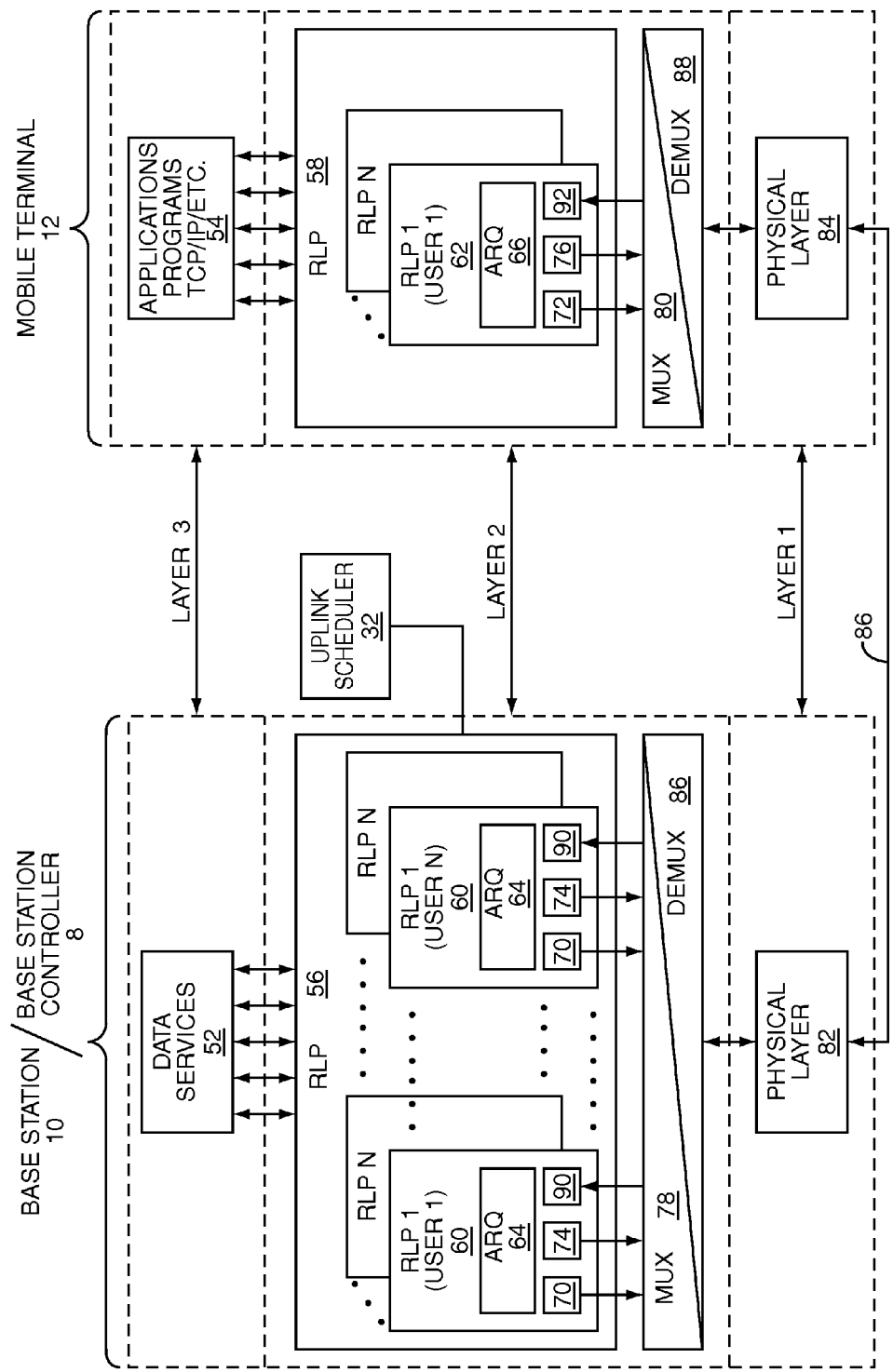
FIG. 2 is logical representation of the base station and mobile terminal according to one embodiment of the present invention.

FIG. 2 illustrates an architecture having cooperating link control entities in the mobile terminal 12 and base station 10 of a wireless communication system according to one embodiment of the present invention. Notably, the logical functionality of a control system for the base station 10 can be distributed to any degree among the base station 10 and the base station controller 8. For conciseness and readability, the description assigns most of the functionality of the present invention to the base station 10. Both the base station 10 and the mobile terminal 12 will support applications and layer 3 signaling services and upper layer services. In one embodiment, the layer 2 link control protocol is preferably the Radio Link Protocol (RLP) provided by an RLP entity 56 for the base station 10 and an RLP entity 58 for the mobile terminal 12. The base station RLP entity 56 normally assigns an RLP entity 60, RLP 1 through RLP N, for each layer 3 data services entity 52 and for each user, user 1 through user N, requiring communication capability. Similarly, the mobile terminal RLP layer 58 assigns an RLP entity 62, RLP 1 through RLP N, for each layer 3 application entity 54 requiring communication capability.

For transmission, each RLP entity 60, 62 will encapsulate all or a portion of one or more packets from the layer 3 applications and protocols 52, 54 into RLP frames. During reception, each RLP entity 60, 62 will process the incoming RLP frames to recover the one or more packets for the layer 3 entity 52, 54. Further, each RLP entity 60, 62 is associated with an automatic repeat request (ARQ) function 64, 66 for the base station 10 and mobile terminal 12, respectively. The ARQ functions 64, 66 control retransmission of lost or corrupted RLP frames. Each ARQ function 64, 66 is associated with a data buffer 70, 72 for buffering RLP frames being transmitted and a retransmit buffer 74, 76 for storing RLP frames that have been transmitted in case retransmission is required.

Both the base station 10 and mobile terminal 12 include multiplexer (MUX) functions 78, 80 used to multiplex RLP frames received from the various applications of the associated users for transmission. The multiplexer functions 78, 80 create media access control (MAC) frames, which encapsulate all or a portion of one or more RLP frames, and provide the MAC frames to the associated physical layers 82, 84. The physical layers 82, 84 then create physical layer frames and transmit the physical layer frames over a wireless medium 86.

During reception of transmitted physical layer frames, the physical layers 82, 84 recover the MAC frames, which are then sent to an associated demultiplexer (DEMUX) functions 86, 88. The demultiplexer functions 86, 88 demultiplex and deliver the recovered RLP frames to the appropriate layer 2 RLP entity 60, 62 of the layer 2 RLP 56, 58. For each RLP entity 60, 62, the received RLP frames are stored in a re-synchronization buffer 90, 92 in cooperation with the associated ARQ function 64, 66. Since the MAC frames, and thus the RLP frames, may be received out of order, the re-synchronization buffer 90, 92 is used to place the received RLP frames in proper order prior to delivering the data to the layer 3 entities 52, 54. The ARQ function 64, 66 monitors incoming data and may request retransmission of lost or corrupted RLP frames.

Figure 3:
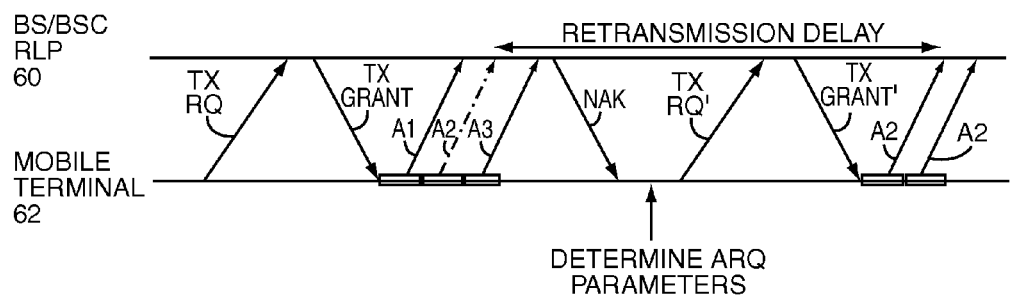
FIG. 3 is an RLP retransmission flow according to the prior art.

With reference to FIG. 3, conventional RLP operation is described for uplink communications. Initially, the RLP entity 62 of the mobile terminal 12 will send a transmission request (TX RQ) to the RLP entity 60 of the base station 10 requesting communication resources to transmit frames A1-A3. The transmission request may include frame or payload size, as well as QoS parameters, such as a maximum allowable transmission delay and desired error rates. After receiving the transmission request at the base station 10, the uplink scheduler 32 will assign the necessary uplink communication resources for the mobile terminal 12 to transmit RLP frames A1-A3, and will initiate a transmission grant (TX GRANT) providing sufficient information to the RLP entity 62 of the mobile terminal 12 to transmit RLP frames A1-A3 during defined time slots. The assigned communication resources provided with the transmission grant may or may not include additional resources for any required retransmissions. Further, the transmission requests may be sent over a low rate control channel or over a random access channel.

Assume that RLP frames A1-A3 are transmitted, but RLP frame A2 is lost or otherwise corrupted as represented by the dashed line. Typically, ARQ based retransmission is controlled by the RLP entity of the sender, which for uplink communications is the RLP entity 62 of the mobile terminal 12. Upon receiving RLP frame A3 after RLP frame A1, the RLP entity 60 determines that the RLP frame A2 is lost and retransmission of the lost RLP frame A2 is necessary. The RLP entity 60 of the base station 10 sends back a NAK specifying RLP frame A2 was lost after determining that RLP frames A1 and A3 were received. The NAK may simply provide the sequence number for the lost RLP frame. After receiving the NAK, the RLP entity 62 of the mobile terminal 12 performs ARQ by determining the appropriate retransmission parameters based on the QoS required by the lost RLP frame A2. Assume the RLP entity 62 of the mobile terminal 12 decides to send two copies of the lost RLP frame A2 during retransmission. If insufficient communication resources are available, the RLP entity 62 of the mobile terminal 12 must trigger a second transmission request (TX RQ') for the additional communication resources required for retransmission of the multiple copies of RLP frame A2.

After receiving the transmission request at the base station 10, the uplink scheduler 32 will assign the necessary uplink communication resources for the mobile terminal 12 to transmit the multiple copies of RLP frame A2, and the RLP entity 60 of the base station 10 will initiate a second transmission grant (TX GRANT') providing sufficient information to the RLP entity 62 of the mobile terminal 12 to transmit RLP frame A2 during defined time slots. After receiving the additional resources from the base station 10 via the second transmission grant, the RLP entity 62 of the mobile terminal will retransmit multiple copies of the RLP frame A2. As illustrated, when the assigned uplink communication resources for initial transmission have insufficient capacity for retransmission of lost RLP frames, the conventional mode is inefficient and results in excessive retransmission delays.

Figure 4:
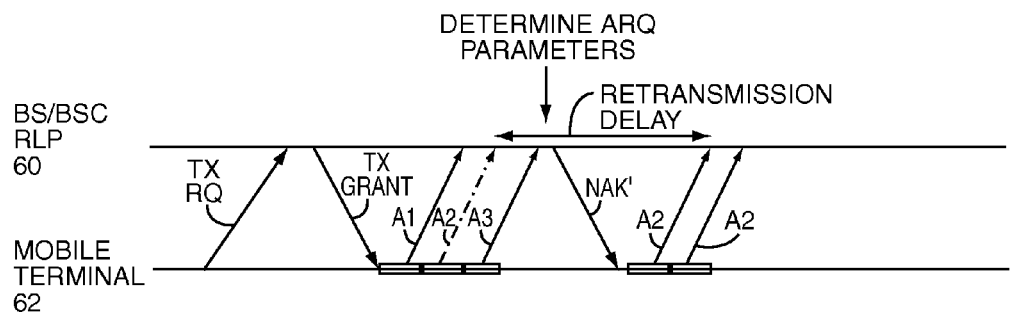
FIG. 4 is an RLP retransmission flow according to a first embodiment of the present invention.

The present invention provides a technique for minimizing the retransmission delays when sufficient communication resources have not been allocated for retransmitting lost RLP frames. With reference to FIG. 4, the technique is described in light of the example provided in FIG. 3. Initially, the RLP entity 62 of the mobile terminal 12 will send a transmission request (TX RQ) to the RLP entity 60 of the base station 10 requesting communication resources to transmit frames A1-A3. Preferably, the transmission request will include not only the payload size, but also any QoS parameters necessary to allow the base station 10 to control retransmission, if necessary. After receiving the transmission request at the base station 10, the uplink scheduler 32 will assign the necessary uplink communication resources for the mobile terminal 12 to transmit RLP frames A1-A3, and the RLP entity 60 of the base station 10 will initiate a transmission grant (TX GRANT) providing sufficient information to the RLP entity 62 of the mobile terminal 12 to transmit RLP frames A1-A3 during defined time slots.

Again, assume that RLP frames A1-A3 are transmitted, but RLP frame A2 is lost or otherwise corrupted. Upon receiving RLP frame A3 after RLP frame A1, the RLP entity 60 of the base station 10 determines that RLP frame A2 is lost and retransmission of the lost RLP frame A2 is necessary. Instead of simply sending back a NAK specifying RLP frame A2 was lost after determining that RLP frame, the RLP entity 60 of the base station 10 will determine the appropriate retransmission parameters based on the QoS required by the lost RLP frame A2. The retransmission parameters may identify the number of copies of the lost RLP frame to send and when to retransmit based on the QoS parameters, such as the maximum allowable delays associated with lost RLP frames or acceptable error rates, provided with the original transmission request. Assume the RLP entity 60 of the base station 10 decides that two copies of the lost RLP frame A2 should be transmitted by the mobile terminal 10 during retransmission. Next, the RLP entity 60 of the base station 10 will contact the uplink scheduler 32 to obtain communication resources required for retransmission of the lost RLP frame A2 and any copies thereof. Preferably, the RLP entity 60 and the uplink scheduler 32 will cooperate to determine if additional communication resources are required for retransmission or if sufficient communication resources for retransmission have already been granted.

If there are insufficient resources to facilitate retransmission of the lost RLP frame A2 and any requisite copies thereof, the uplink scheduler 32 will provide additional communication resources to the RLP entity 60 of the base station 10 for retransmission of the lost RLP frame A2 and any copies thereof. The RLP entity 60 of the base station 10 then sends back a NAK including identification of the lost RLP frame A2, the retransmission parameters, and, if necessary, a transmission grant for retransmission. The transmission grant corresponds to the additional communication resources allocated for retransmission. After receiving the NAK, the RLP entity 62 of the mobile terminal 12 can immediately trigger retransmission of the lost RLP frame A2 according to the retransmission parameters provided by the RLP entity 60 of the base station 10 and according to the communication resources allocated by the uplink scheduler 32.

Accordingly, the RLP entity 60 of the base station 10 identifies a lost RLP frame, and the base station 10 determines the appropriate retransmission parameters based on the QoS levels and issues a NAK, which includes the corresponding additional communication resources needed for retransmission. The RLP entity 62 of the mobile terminal 12 is then able to quickly retransmit the RLP frames using the newly granted communication resources. The signaling overhead and retransmission delays associated with the conventional retransmission techniques are greatly reduced.

The present invention also facilitates switching between the conventional and proposed RLP retransmission techniques. When the base station 10 determines that the previously assigned communication resources are sufficient to handle any necessary retransmissions, the conventional RLP ARQ mode is applied wherein the RLP entity 60 of the base station 10 sends a NAK to the RLP entity 62 of the mobile terminal 12 for a lost RLP frame, and the RLP entity 62 of the mobile terminal 12 determines when and how many copies of the lost RLP frame to retransmit. Otherwise, when the currently assigned resources are insufficient to handle retransmissions, the proposed RLP mode is applied. Since the RLP entity 60 of the base station 10 is aware of the communication resources already granted, identifying which RLP mode to use and switching dynamically between the two modes is readily achievable. Whenever the RLP entity 60 of the base station 10 needs to request retransmission, it first checks with the uplink scheduler 32 to determine the availability of the mobile terminal's already-assigned communication resources. If these communication resources are sufficient for the retransmission, the RLP entity 60 of the base station 10 will issue a simple NAK and not attach any additional resource assignment. Otherwise, the RLP entity 60 of the base station 10 will request additional communication resources from the uplink scheduler 32 and attach a corresponding transmission grant to the NAK signal. Dynamic switching between the two RLP modes can occur seamlessly as required. This multi-mode uplink RLP scheme improves overall performance by reducing the amount of signaling overhead and overall transmission delays.

For downlink communications, the base station's transmit circuitry 24 typically transmits at a consistent power level for all mobile terminals 12 over all scheduled time slots. Given varying channel conditions and other variables affecting wireless communications, the base station 10 and mobile terminal 12 cooperate to achieve communications with a desired error rate. If error rates are too high, quality of service levels drop to undesirable levels and the amount of traffic increases due to the retransmission of lost information. If error rates are too low for any given mobile terminal 12, communication resources are wasted and data rates could be increased to optimize efficiency of the system.

Since the base station 10 typically maintains a constant transmit power during downlink communications, the communication resources for downlink communications may pertain to scheduled time slots for transmission and the link mode used to facilitate downlink transmissions. The link mode relates to the type of coding, modulation, and data rates used to facilitate downlink communications. In general, the more robust the encoding and modulation, the lower the data rates, wherein the goal would be to achieve the desired error rate while maximizing data rate and using higher encoding and higher order modulation.

For uplink communications, transmit power levels of the mobile terminals 12 are constantly varied in an effort to maintain the desired error rates for uplink communications. Keeping the mobile terminal's transmit power at minimum required levels to achieve a desired error rate minimizes the interference injected on communications associated with other mobile terminals 12, as well as extending the battery life of the mobile terminal 12. Thus, the primary communication resources requested by the mobile terminals 12 and granted by the base station 10 for uplink communications are time slots and the transmit power required to achieve the minimum error rate for uplink communications.

Another embodiment of the present invention efficiently identifies missing RLP frames in a multiplexed stream of RLP frames originating from two or more applications and users. As described above, each layer 3 entity 52, 54 has its own RLP entity 60, 62, which forms RLP frames by inserting a RLP frame header, including a sequence number and possible fragmentation information. The RLP frames originating from different applications 52, 54 are encapsulated into MAC frames and are multiplexed together by multiplexer function 78, 80 into a single data stream, which is sent to the physical layer 82, 84. The physical layer 82, 84 creates physical layer frames from the stream of MAC frames and transmits the physical layer frames over the wireless link. The MAC frames typically include a MAC frame header having an application ID and, for downlink communications, a user ID.

During reception, the physical layer 82, 84 receives the transmitted physical layer frames, recovers the MAC frames, and sends the MAC frames to the demultiplexer function 86, 88. The demultiplexer function 86, 88 separates the RLP frames based on the application, and if the RLP frames are being received by the base station 10, further separates the RLP frames based on the user. The demultiplexer function 86, 88 sends each RLP frame to the corresponding RLP entity 60, 62. As noted, the RLP entity 60, 62 has traditionally been responsible for identifying any lost or corrupted RLP frames and requesting retransmission.

Figure 5:
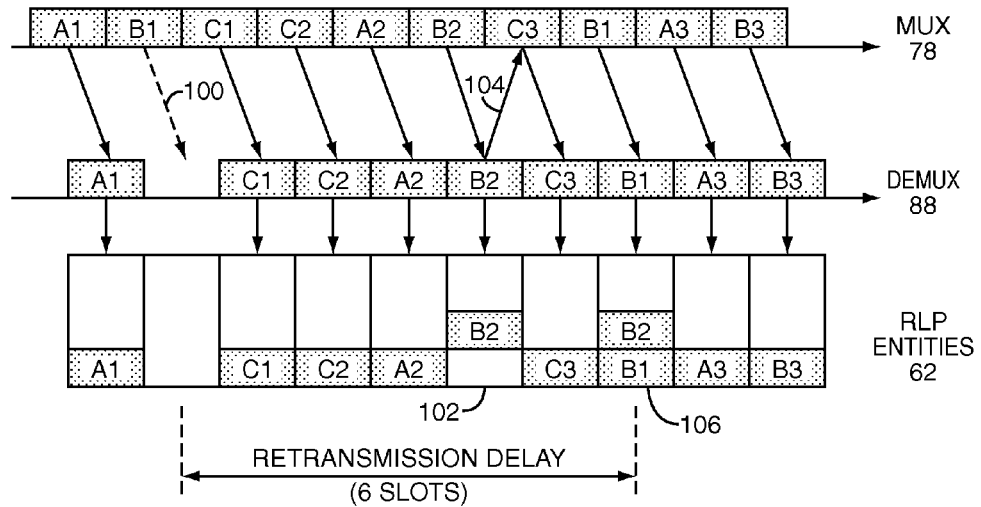
FIG. 5 is another RLP retransmission flow according to the prior art.

A retransmission process according to the prior art is illustrated for reference in FIG. 5. Although the concepts for this embodiment are applicable to uplink and downlink communications, assume the base station 10 is transmitting information to the mobile terminal 12 over a downlink and that three applications A, B, and C produce a multiplexed data stream of RLP frames to be transmitted. Each application produces information resulting in three RLP frames A1-A3, B1-B3, and C1-C3. The resultant multiplexed data stream is as follows A1, B1, C1, C2, A2, B2, C3, A3, and B3 wherein each original transmission occurs as scheduled. For the sake of simplicity, frame or packet fragmentation is not shown.

As depicted, RLP frame B1 is lost during transmission (100). Traditionally, the RLP entity 62 of the mobile terminal 12 cannot determine that RLP frame B1 was lost until RLP frame B2 is received several time slots later (102). By the time retransmission for RLP frame B1 is requested (104) and performed, a retransmission delay of six time slots has been incurred. Upon receipt of the retransmitted RLP frame B1, the RLP entity 62 will process RLP frames B1 and B2 in traditional fashion (106). Note that the retransmission delay is increased if RLP frame B2 is also lost or its transmission delayed by additional multiplexed RLP frames from the other applications 52.

Figure 6:
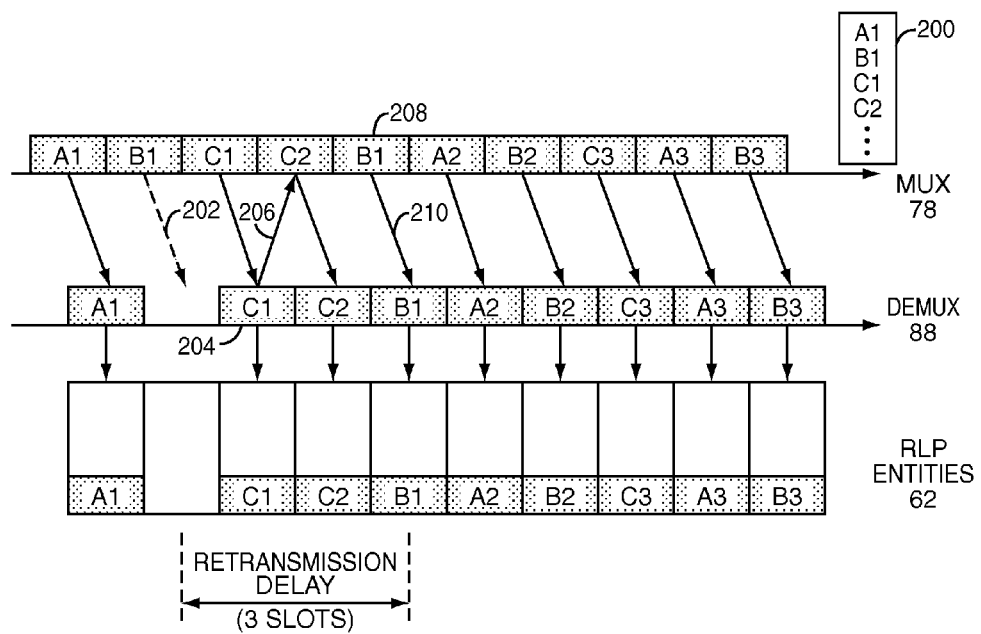
FIG. 6 is an RLP retransmission flow according to a second embodiment of the present invention.

FIG. 6 illustrates the multi-application RLP scheme according to one embodiment of the present invention. Again, the concepts for this embodiment are applicable to uplink and downlink communications; however, assume the base station 10 is transmitting information to the mobile terminal 12 over a downlink and that three applications A, B, and C produce a multiplexed data stream of RLP frames to be transmitted. Each application produces information resulting in three RLP frames A1-A3, B1-B3, and C1-C3. The resultant multiplexed data stream is as follows A1, B1, C1, C2, A2, B2, C3, A3, and B3 wherein each original transmission occurs as scheduled.

A transmission table 200 is associated with the multiplexer function 78 and maintains a record of the RLP frames that have been transmitted for all of the applications and users. Assume that RLP frame B1 is corrupted during transmission (202). During reception, the physical layer 84 of the mobile terminal 12 will receive the transmitted physical layer frames and recover the encapsulated MAC frames. The MAC frames are sent to demultiplexer function 88 for demultiplexing the RLP frames for the corresponding RLP entities 62. The demultiplexer function 88 keeps track of properly received RLP frames from the various applications.

The physical layer 84 is able to detect failed attempts to receive a physical layer frame or recover an MAC frame and send an indication of the error to the demultiplexer function 88. Upon receiving the indication of the error, the demultiplexer function 88 will set a timer to impose a short delay in case a copy of the corrupted RLP frame is transmitted or the RLP frame is subsequently recovered (204). The short delay also allows for recovery of subsequent RLP frames. If the RLP frame is recovered before expiration, the timer is cancelled. Reference is made to application Ser. No. 10/020,834, filed Dec. 13, 2001, entitled PHYSICAL LAYER ASSISTED RETRANSMISSION, currently pending, which is incorporated herein by reference, for additional information on using the physical layer to detect corrupted frames.

If the timer expires, which indicates retransmission of the RLP frame is required, the demultiplexer function 88 issues a NAK for transmission to the base station 10 (206). The NAK includes information about the RLP frames preceding and following the lost RLP frame, even if those RLP frames are from different applications. The multiplexer function 78 at the base station 10 will use the information in the NAK to check its transmission table 200, identify the lost RLP frame, and notify the corresponding RLP entity 60 at the base station 10 to trigger immediate retransmission of the lost RLP frame (208). The lost RLP frame is identified by comparing the properly received RLP frames identified in the information provided with the NAK and the list of RLP frames kept in the transmission table 200. The lost RLP frame is then retransmitted (210). Use of the demultiplexer 88 and multiplexer 78 to assist in RLP retransmission shortens the retransmission delay of RLP frame B1 to only three time slots, which is down from a delay of six time slots if existing RLP algorithms are used.

If the RLP frame is only partially corrupted wherein the RLP header, which includes the RLP frame identifier, is detected correctly and only the payload is in error, the demultiplexer function 88 can notify the corresponding RLP entity 62 to immediately issue a NAK identifying the corrupted RLP frame. Those skilled in the art will recognize the applicability of the second embodiment to both uplink and downlink communications. For uplink communications, the functionality and flow are simply reversed from that described immediately above.

Those skilled in the art will recognize improvements and modifications to the preferred embodiments of the present invention. For example, various types of link control protocols may benefit from the present invention and be implemented to various degrees in and between the base station and base station controller. Further, any packets or frames described above may represent multiple packets and frames or portions thereof in case of fragmentation. All such improvements and modifications are considered within the scope of the concepts disclosed herein and the claims that follow.

What is claimed is:

1. A wireless communication system comprising:
   a) a physical layer facilitating wireless communications with a remote device over a wireless medium;
   b) a link control layer with a plurality of link control entities facilitating communication using a link control protocol;
   c) a multiplexer function adapted to:
      i) multiplex frames from the plurality of link control entities to create a stream of frames, which are delivered to the physical layer for transmission over the wireless medium to the remote device;
      ii) maintain a transmission table containing transmitted frames;
      iii) receive an indication from the remote device that at least one of the transmitted frames was lost or corrupted and information regarding ones of the transmitted frames that were properly received by the remote device; and
      iv) identify the at least one of the transmitted frames that was lost or corrupted by comparing the transmitted frames of the transmission table with the ones of the transmitted frames that were properly received by the remote device.

2. The system of claim 1 wherein the multiplexer function is further adapted to effect retransmission of the at least one of the transmitted frames that was lost or corrupted.

3. The system of claim 1 wherein the indication from the remote device is a negative acknowledgement provided as part of an automatic repeat request process.

4. The system of claim 1 wherein the multiplexer function is further adapted to:
   a) receive alternate indication from the remote device identifying at least one specific frame that was partially corrupted during transmission when the remote device can determine the identity of a partially corrupted frame; and
   b) effect retransmission of the at least one specific frame that was lost or corrupted.

5. A wireless communication system comprising:
   a) a physical layer facilitating wireless communications with a remote device over a wireless medium;
   b) a link control layer with a plurality of link control entities facilitating communication using a link control protocol;
   c) a demultiplexer function adapted to:
      i) demultiplex a stream of frames recovered by the physical layer and deliver the frames to corresponding ones of the plurality of link control entities;
      ii) receive a message from the physical layer that at least one of the frames was lost or corrupted; and
      iii) effect transmission of an indication to the remote device that at least one of the transmitted frames was lost or corrupted and information regarding ones of the transmitted frames that were properly received.

6. The system of claim 5 wherein the indication from the remote device is a negative acknowledgement provided as part of an automatic repeat request process.

7. The system of claim 5 wherein the demultiplexer function is further adapted to effect transmission of an alternate indication identifying at least one specific frame that was partially corrupted during transmission when the identity of a partially corrupted frame is determined.

8. The system of claim 5 wherein the demultiplexer function is further adapted to:
   a) set a timer when the message from the physical layer that at least one of the frames was lost or corrupted is received; and
   b) when the timer expires, effect transmission of the indication to the remote device that at least one of the transmitted frames was lost or corrupted and information regarding ones of the transmitted frames that were properly received.

9. A method for facilitating retransmission comprising:
   a) multiplexing frames from a plurality of link control entities to create a stream of frames, which are delivered to a physical layer for transmission over a wireless medium to a remote device;
   b) maintaining a transmission table containing transmitted frames at a multiplexer function;
   c) receiving an indication from the remote device that at least one of the transmitted frames was lost or corrupted and information regarding ones of the transmitted frames that were properly received by the remote device; and d) identifying the at least one of the transmitted frames that was lost or corrupted by the comparing the transmitted frames of the transmission table with the ones of the transmitted frames that were properly received by the remote device at the multiplexer function.

10. The method of claim 9 further comprising effecting retransmission of the at least one of the transmitted frames that was lost or corrupted via the multiplexer function.

11. The method of claim 9 wherein the indication from the remote device is a negative acknowledgement provided as part of an automatic repeat request process.

12. The method of claim 9 further comprising:
a) receiving an alternate indication from the remote device identifying at least one specific frame that was partially corrupted during transmission when the remote device can determine the identity of a partially corrupted frame; and
b) effecting retransmission of the at least one specific frame that was lost or corrupted via the multiplexer function.

13. A method for facilitating retransmission comprising:
a) demultiplexing a stream of frames recovered by a physical layer and delivering the frames to corresponding ones of a plurality of link control entities;
b) receiving a message from the physical layer that at least one of the frames was lost or corrupted; and
c) effecting transmission of an indication to a remote device that at least one of the transmitted frames was lost or corrupted and information regarding ones of the transmitted frames that were properly received via a demultiplexer function.

14. The method of claim 13 wherein the indication from the remote device is a negative acknowledgement provided as part of an automatic repeat request process.

15. The method of claim 13 further comprising effecting transmission of an alternate indication identifying at least one specific frame that was partially corrupted during transmission when the identity of a partially corrupted frame is determined.

16. The method of claim 13 further comprising:
a) setting a timer when the message from the physical layer that at least one of the frames was lost or corrupted is received; and
b) when the timer expires, effecting transmission of the indication to the remote device that at least one of the transmitted frames was lost or corrupted and information regarding ones of the transmitted frames that were properly received.

* * * * *

UNITED STATES PATENT AND TRADEMARK OFFICE
CERTIFICATE OF CORRECTION

PATENT NO. : 7,436,834 B1 Page 1 of 1
APPLICATION NO. : 11/552797
DATED : October 14, 2008
INVENTOR(S) : Zhang et al.

It is certified that error appears in the above-identified patent and that said Letters Patent is hereby corrected as shown below:

Title page,
Item [73] Assignee, please add as follows: -- Assignee: Nortel Networks Limited, St. Laurent (CA) --

Signed and Sealed this

Twenty-third Day of December, 2008

JON W. DUDAS
*Director of the United States Patent and Trademark Office*